United States Patent
Kang

(10) Patent No.: US 7,119,827 B2
(45) Date of Patent: Oct. 10, 2006

(54) METHOD FOR PERFORMING A CAMERA FUNCTION IN A MOBILE COMMUNICATION TERMINAL

(75) Inventor: Yang-Muk Kang, Gumi-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 11/077,122

(22) Filed: Mar. 11, 2005

(65) Prior Publication Data
US 2006/0109340 A1 May 25, 2006

(30) Foreign Application Priority Data
Nov. 25, 2004 (KR) .................. 10-2004-0097673

(51) Int. Cl.
H04M 11/00 (2006.01)
(52) U.S. Cl. .................................. 348/14.02
(58) Field of Classification Search ............ 348/14.01, 348/14.02, 14.05, 14.06, 14.08; 455/566.1, 455/343.2, 569.1, 569.2, 550.1
See application file for complete search history.

(56) References Cited

U.S. PATENT DOCUMENTS

| | | | | |
|---|---|---|---|---|
| 6,078,825 A | * | 6/2000 | Hahn et al. | 455/569.2 |
| 6,233,002 B1 | * | 5/2001 | Shibayama | 348/14.05 |
| 6,870,890 B1 | * | 3/2005 | Yellin et al. | 455/343.2 |
| 6,950,126 B1 | * | 9/2005 | Homma et al. | 455/550.1 |
| 2004/0192400 A1 | * | 9/2004 | Chwa | 455/566 |

FOREIGN PATENT DOCUMENTS

| | | | |
|---|---|---|---|
| JP | 2002335345 A | * | 11/2002 |
| JP | 2004064771 A | * | 2/2004 |

* cited by examiner

Primary Examiner—Stella Woo
(74) Attorney, Agent, or Firm—Roylance, Abrams, Berdo & Goodman, L.L.P.

(57) ABSTRACT

A method for performing a camera function in a mobile communication terminal. When the mobile communication terminal is switched to a camera mode in a state in which it is connected to an earphone with a predetermined key for performing call connection and termination functions, the predetermined key of the earphone is configured as a shutter key for capturing an image. When a signal of the predetermined key processed as the shutter key is input from the earphone, the image is captured. A clearer image can be captured without blur when the call connection and termination key serves as the shutter key in an earphone or a wireless headset connected to the mobile communication terminal, rather than the shutter key provided in the conventional mobile communication terminal.

4 Claims, 3 Drawing Sheets

METHOD FOR PERFORMING A CAMERA FUNCTION IN A MOBILE COMMUNICATION TERMINAL

PRIORITY

This application claims the benefit under 35 U.S.C. §119 (a) of an application entitled "METHOD FOR PERFORMING A CAMERA FUNCTION IN A MOBILE COMMUNICATION TERMINAL", filed in the Korean Intellectual Property Office on Nov. 25, 2004 and assigned Ser. No. 2004-97673, the entire contents of which are incorporated herein by reference.

BACKGROUND OF THE INVENTION

1. Field of the Invention

The present invention relates generally to a method for performing a camera function in a mobile communication terminal. More particularly, the present invention relates to a method for performing a camera function using an earphone or wireless headset connected to the mobile communication terminal.

2. Description of the Related Art

Generally, mobile communication terminals are devices for providing a communication function capable of transmitting and receiving a call or data while they are on the move, as in a cellular phone, personal digital assistant (PDA), personal communication service (PCS) phone, international mobile telecommunications-2000 (IMT-2000) terminal, global system for mobile communications (GSM) terminal, or the like.

Mobile communication terminals have become necessities of life because they may be carried anytime and anywhere. The current trend is that the mobile communication terminal is becoming more compact, slim, and lightweight for easy portability. Furthermore, the mobile communication terminal is being developed to provide various multimedia functions. In the near future, the mobile communication terminal will be used as a compact, multifunctional, and versatile device, and will be modified to be adapted to various multimedia and Internet applications.

Currently, mobile communication terminals are developing into devices capable of transmitting high-speed data in addition to a voice communication function. That is, when a mobile communication system of the IMT-2000 standard is implemented, a high-speed data communication function, as well as the voice communication function, can be performed using the mobile communication terminals. Data capable of being processed in the mobile communication terminal, which is performing the data communication function, can be packet data and image data. As the mobile communication terminal is recently equipped with a camera or television (TV) receiver, it can perform the function of displaying an image or video signal. Thus, the mobile communication terminal equipped with the camera can take pictures to display moving and still pictures, and can transmit pictures taken by the camera.

When a user presses a shutter key of the camera for capturing an image, the mobile communication terminal captures the image. The camera and the shutter key are conventionally mounted to a main body of the mobile communication terminal. Because the mobile communication terminal may be shaken even minutely due to the unnatural motion that occurs when the user actuates the shutter key after the focus of an image to be captured has already been adjusted, it is difficult for a clear image to be captured.

SUMMARY OF THE INVENTION

Accordingly, the present invention has been designed to solve the above and other problems occurring in the prior art. Therefore, it is an aspect of the present invention to provide a method for performing a camera function in a mobile communication terminal that can capture an image in a state in which it is not shaken when a shutter key is actuated.

The above and other aspects of the present invention can be accomplished by a method for performing a camera function in a mobile communication terminal. The method comprises the steps of recognizing a predetermined key of an earphone as a shutter key for capturing an image, when the mobile communication terminal is switched to a camera mode in a state in which it is connected to the earphone with the predetermined key for performing call connection and termination functions; and capturing the image when a signal of the predetermined key recognized as the shutter key is input from the earphone.

Preferably, the method further comprises the steps of detecting an incoming call received by the mobile communication terminal after recognizing the predetermined key of the earphone as the shutter key for capturing the image; switching the mobile communication terminal to a call mode when the incoming call is detected in the camera mode; and recognizing the predetermined key as a call connection and termination key when the mobile communication terminal is switched to the call mode.

The above and other aspects of the present invention can be accomplished by a method for performing a camera function in a mobile communication terminal. The method further comprises the steps of recognizing a predetermined key of a headset as a shutter key for capturing an image, when the mobile communication terminal for transmitting and receiving data is switched to a camera mode in a state in which it is connected to the headset with the predetermined key for performing call connection and termination functions in a wireless fashion; and capturing the image when an input signal of the predetermined key recognized as the shutter key is received from the headset.

BRIEF DESCRIPTION OF THE DRAWINGS

The above and other aspects and advantages of the present invention will be more clearly understood from the following detailed description taken in conjunction with the accompanying drawings, in which.

Throughout the drawings, it should be understood that like reference numbers refer to like features, structures and elements.

DETAILED DESCRIPTION OF THE PREFERRED EMBODIMENTS

Figure 1:
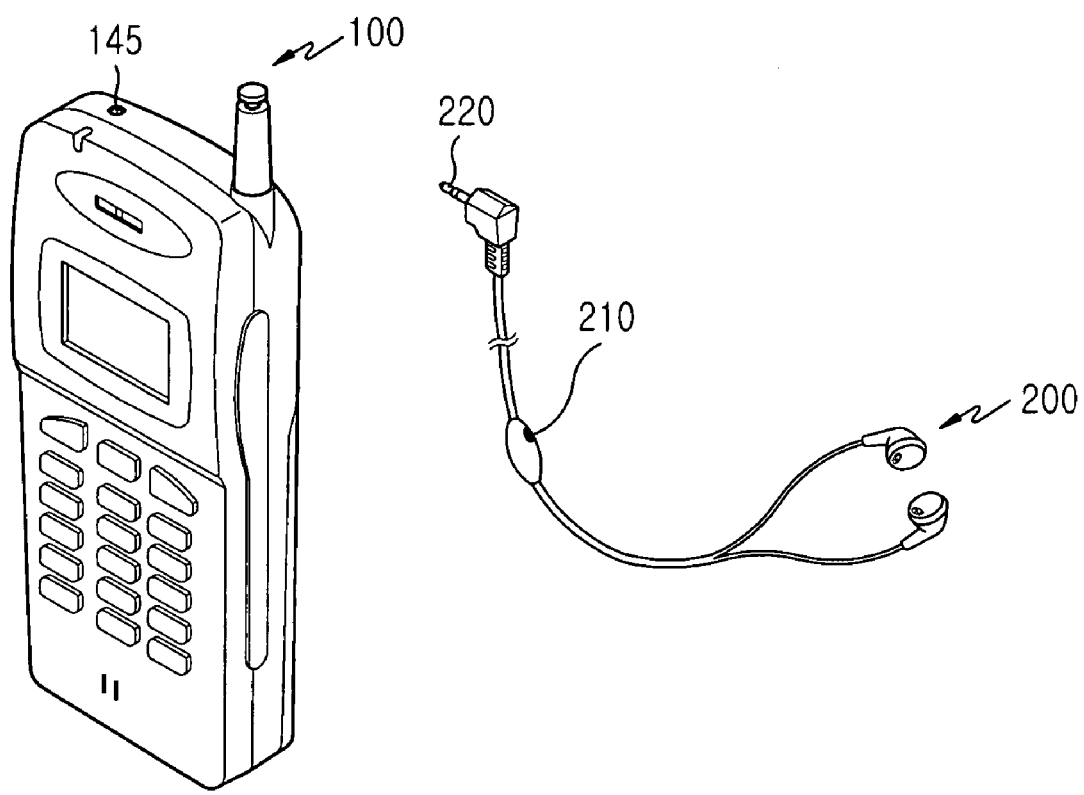
FIG. 1 is a perspective view illustrating an earphone and a mobile communication terminal in accordance with an embodiment of the present invention.

Embodiments of the present invention will now be described in detail herein below with reference to the accompanying drawings. In the drawings, the same or similar elements are denoted by the same reference numerals even though they are depicted in different drawings. Additionally, in the following description, a detailed description of known functions and configurations incorporated herein will be omitted for conciseness.

FIG. 1 is a perspective view illustrating an earphone and a mobile communication terminal in accordance with an embodiment of the present invention. Referring to FIG. 1, the mobile communication terminal 100 comprises a jack connector 145 for connecting a jack 220 of the earphone 200 to the terminal 100. When the jack 220 of the earphone 200 is inserted into the jack connector 145, the mobile communication terminal 100 is connected to the earphone 200. A user can communicate with a calling or called party through a microphone and a speaker provided in the earphone 200 in a hands-free state. A key 210 provided in the earphone 200 for performing call connection and termination functions may separately include a call connection key and a call termination key. It is preferred that the call connection and termination keys are integrated into a single key such that an incoming call is connected by actuating the key 210 when the incoming call is received and sound for a notification of the incoming call is output, and the incoming call is terminated by re-actuating the key 210. Actuation of the key 210 sends a signal to the control unit 160 that the call should be connected when a call is incoming or terminated when ending a call.

Figure 2:
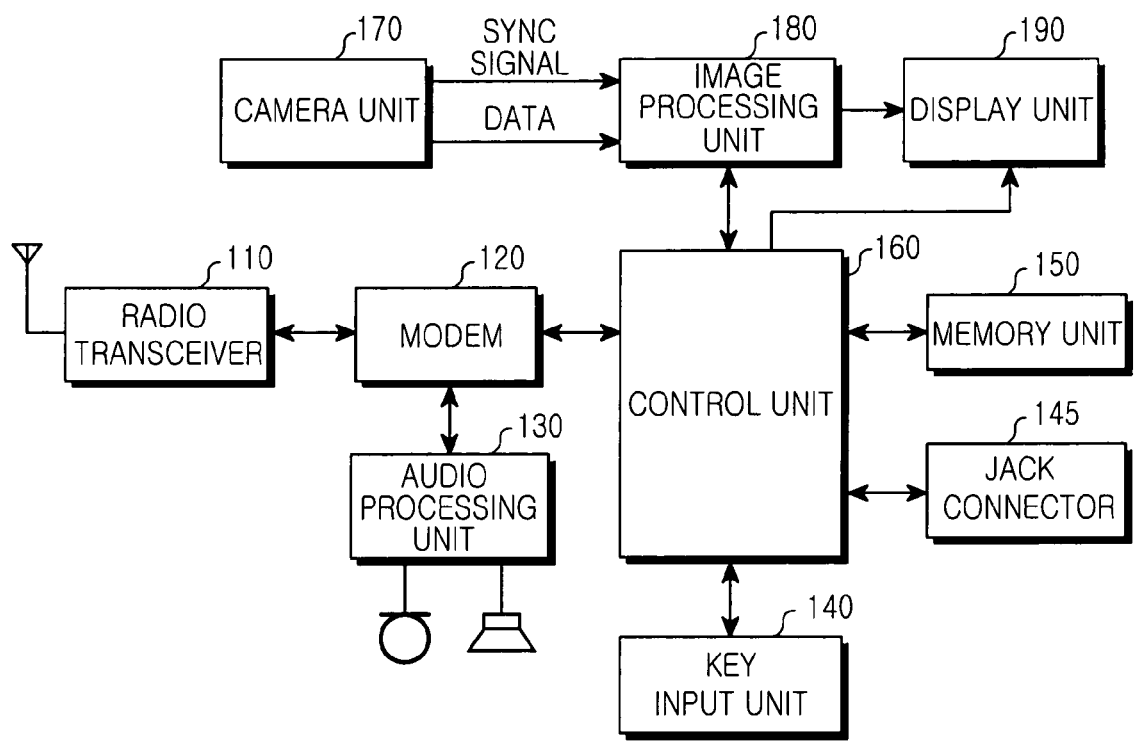
FIG. 2 is a block diagram illustrating the mobile communication terminal in accordance with an embodiment of the present invention.

FIG. 2 is a block diagram illustrating the mobile communication terminal 100 in accordance with an embodiment of the present invention. As illustrated in FIG. 2, the mobile communication terminal 100 comprises a radio transceiver 110, a modulator-demodulator (MODEM) 120, an audio processing unit 130, a key input unit 140, a jack connector 145, a memory unit 150, a control unit 160, a camera unit 170, an image processing unit 180, and a display unit 190.

Referring to FIGS. 1 and 2, the radio transceiver 110 is responsible for transmitting and receiving voice data, text data, image data, and control data according to a control operation of the control unit 160. The radio transceiver 110 comprises a radio frequency (RF) transmitter for up converting and amplifying a frequency of a signal to be transmitted, an RF receiver for low-noise amplifying a received signal and down converting a frequency of the received signal and the like. More specifically, the radio transceiver 110 preferably for RF communication with a wireless headset (not shown) comprises a key similar to key 210 for performing the call connection and termination functions in a wireless fashion in accordance with the embodiment of the present invention. When the mobile communication terminal 100 is switched to a camera mode and an input signal of the key similar to key 210 is received from the headset, the received input signal is delivered to the control unit 160.

The MODEM 120 includes a transmitter for encoding and modulating a signal to be transmitted, a receiver for demodulating and decoding a received signal, and other typical functions.

The audio processing unit 130 can be configured by a coder-decoder (CODEC). The CODEC includes a data CODEC for processing packet data, and other typical CODEC functions and an audio CODEC for processing an audio signal, such as voice, music, tones or the like.

The audio processing unit 130 modulates an electric signal received from a microphone and performs a conversion into voice data. The audio processing unit 130 demodulates encoded voice data input from the radio transceiver 110 into an electric signal to output the demodulated data to a speaker. It is preferred that the audio processing unit 130 includes the CODEC for converting a digital audio signal received by the radio transceiver 110 into an analog audio signal to reproduce the analog signal or converting an analog audio signal generated from the microphone into a digital audio signal. Alternatively, the CODEC may be included in the control unit 160.

More specifically, the audio processing unit 130 performs a modulation, demodulation, and voice signal processing operation for digital processing of a voice signal input and output through the microphone and speaker of the mobile communication terminal 100, and the earphone 200 or the wireless headset (not shown) connected to the mobile communication terminal 100.

The key input unit 140 has a key matrix structure (not shown), and includes character keys, number keys, function keys, and an external volume key. The key input unit 140 outputs, to the control unit 160, an input signal corresponding to a key actuation by the user. More specifically, the key input unit 140 can include a shutter key for use in capturing an image at a predetermined location.

The jack connector 145 serves as a connector for connecting the mobile communication terminal 100 to the earphone 200. When the jack 220 of the earphone 200 is inserted and a signal of the call connection and termination key 210 is input, the input signal is delivered to the control unit 160.

The memory unit 150 can be configured by program and data memories. The memory unit 150 stores various types of information necessary for controlling the operation of the mobile communication terminal 100 and user selection information in accordance with an embodiment of the present invention. That is, the memory unit 150 can include a read only memory (ROM) for storing an operation algorithm to be accessed through the control unit 160 for controlling the overall operation of the mobile communication terminal 100 and a random access memory (RAM) for storing data according to a control command in a data processing method of the control unit 160.

The control unit 160 controls the overall operation of the mobile communication terminal 100 in accordance with the embodiment of the present invention. After the control unit 160 is connected to the earphone 200 or the wireless headset (not shown) comprising a key similar to key 210 for performing the call connection and termination functions, the key 210 is preferably recognized as the shutter key for capturing an image when the mobile communication terminal 100 is switched to the camera mode in response to a camera mode request of the user.

When a signal of the key 210 recognized as the shutter key is input through the jack connector 145, the control unit 160 controls the camera unit 170 to capture an image. In another embodiment of the present invention, when the mobile communication terminal 100 is connected to the wireless headset in the wireless fashion, the control unit 160 controls an operation for receiving a signal of the call connection/termination key provided in the wireless headset through the radio transceiver 110 and capturing an image.

When an incoming call is detected in the camera mode, the control unit 160 switches the mobile communication terminal 100 to a call mode. At this point, the key 210 serves as an incoming call connection or termination key rather than the shutter key.

The camera unit 170 can include a removable lens (not shown) and serves to capture images. The camera unit 170 includes a camera sensor (not shown) for converting an optical image signal into an electric signal, and a signal processor (not shown) for converting an analog image signal into digital data.

Here, it is assumed that the camera sensor is preferably a charge-coupled device (CCD). The signal processor can be implemented by a digital signal processor (DSP). The camera sensor and the signal processor can be implemented in a single body, or can be separately implemented.

The image processing unit 180 performs a function for generating display data to display an image signal output from the camera unit 170.

The image processing unit 180 processes the image signal output from the camera unit 170 in frame units. The image processing unit 180 outputs the frame image data appropriate to the characteristics and size of the display unit 190. The image processing unit 180 comprises an image CODEC, and performs a function for compressing the frame image data displayed on the display unit 190 according to a predetermined compression algorithm or for recovering the compressed frame image data into original frame image data.

It is assumed that the image processing unit 180 has an on-screen display (OSD) function, and can output OSD data based on the size of an image to be displayed according to a control operation of the control unit 160.

Here, the display unit 190 can use a liquid crystal display (LCD) and output various display data generated from the mobile communication terminal 100. When the LCD is implemented using a touch-screen system, the LCD can also serve as an input unit.

The display unit 190 displays an image signal output from the image processing unit 180, and displays user data output from the control unit 160.

Figure 3:
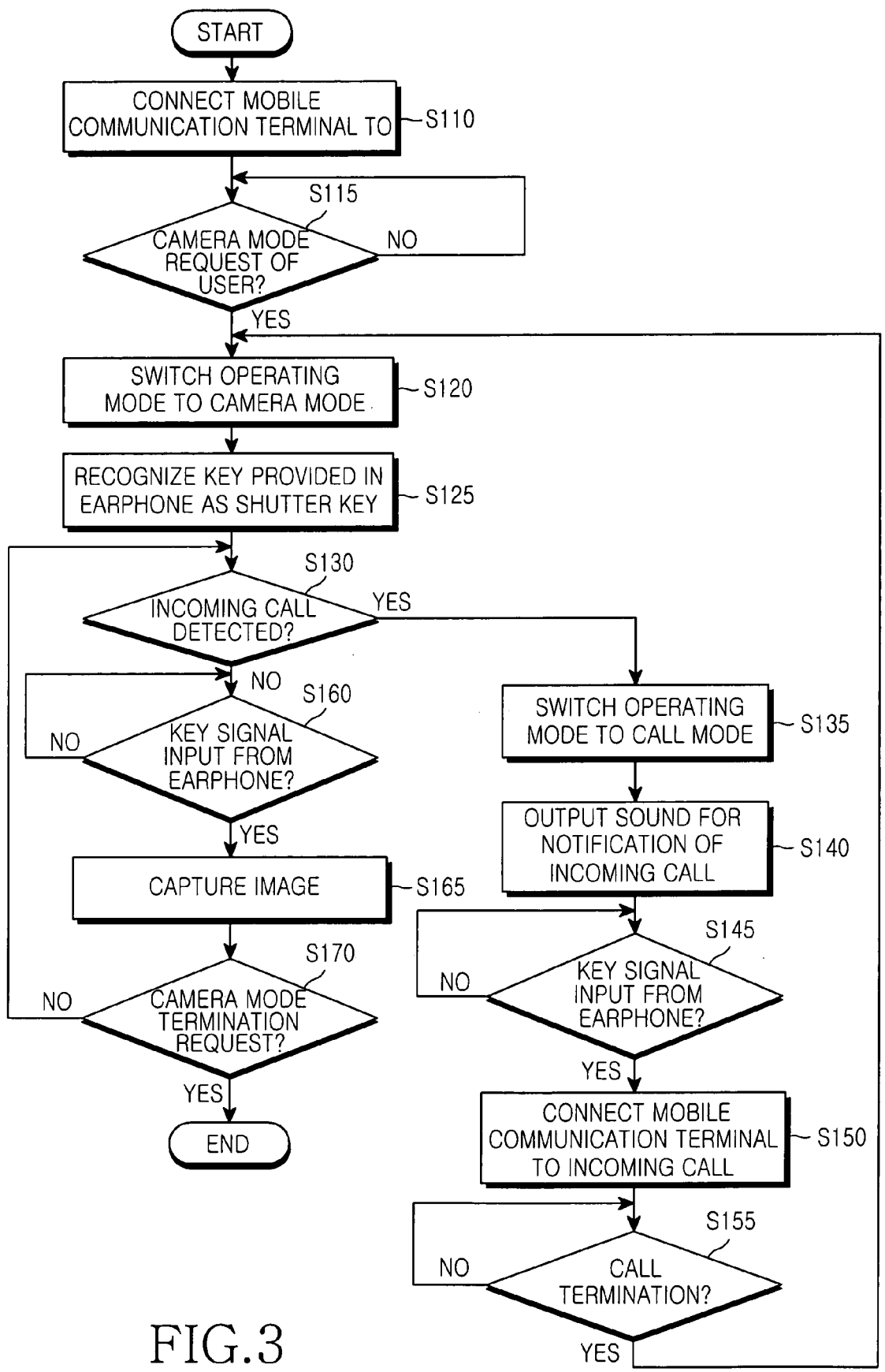
FIG. 3 is a flow diagram illustrating a procedure for performing a camera function in the mobile communication terminal in accordance with an embodiment of the present invention.

FIG. 3 is a flow diagram illustrating a method for controlling a camera function in the mobile communication terminal 100 in accordance with an embodiment of the present invention.

Referring to FIGS. 1 to 3, the mobile communication terminal 100 is connected to the earphone 200 for performing call connection and termination functions according to an input of the key 210 through the jack connector 145 or via wireless communication means (Step S110). Subsequently, the control unit 160 determines if a camera mode request, which can be received through a voice input, a key input set for the camera mode, or a menu key input, is present (Step S115).

If the camera mode request is present, the control unit 160 switches the mobile communication terminal 100 to a camera mode (Step S120).

When the mobile communication terminal 100 is switched to the camera mode, the control unit 160 recognizes the call connection/termination key 210 of the earphone 200 connected through the jack connector 145 or via wireless communication means as the shutter key for capturing an image (Step S125).

The control unit 160 determines if an incoming call is detected through a paging channel connected to a base station (not shown) in the camera mode (Step S130). If the incoming call is detected, the control unit 160 switches the mobile communication terminal 100 to a call mode (Step S135) and outputs sound for a notification of the incoming call through the speaker (Step S140). When the camera mode is switched to the call mode, the control unit 160 recognizes the key 210 as the call connection and termination key rather than the shutter key. When an operating mode for the notification of the incoming call is not a ringtone mode, the control unit 160 notifies the user of the incoming call in a vibration or soundless mode.

When a signal of the call connection/termination key 210 of the earphone 200 is input through the jack connector 145 or the wireless communication means in response to the user's manipulation of connection/termination key 210 (Step S145), the control unit 160 controls the mobile communication terminal 100 to be connected to the incoming call such that the user communicates with a calling party (Step S150).

When a call termination request is present after the call connection function is performed, the control unit 160 switches the mobile communication terminal 100 back into the camera mode (Step S155).

On the other hand, when no incoming call is detected through the paging channel in step S130, the control unit 160 determines if a signal of the call connection/termination key 210 is input (Step S160).

If the signal of the call connection/termination key 210 is input through the jack connector 145 or the wireless communication means, the control unit 160 controls the camera unit 170 to capture an image (Step S165).

The control unit 160 determines if a camera mode termination request of the user is present (Step S170).

If no camera mode termination request is present, the control unit 160 returns to step S130. However, if the camera mode termination request is present, the control unit 160 terminates the camera mode of the mobile communication terminal 100 and switches the mobile communication terminal 100 to an idle state.

In accordance with the embodiment of the present invention, the user of the mobile communication terminal 100 can capture a clear image without blur by making use of the call connection and termination key 210 serving as the shutter key provided in the earphone 200 or the wireless headset connected to the mobile communication terminal 100, rather than making use of the shutter key provided in the conventional mobile communication terminal.

An embodiment of the present invention in which a mobile communication terminal is connected to an earphone in a wired fashion has been described. However, the present invention can be applied to a structure in which a wireless headset for transmitting and receiving wireless data is connected to the mobile communication terminal through a local-area communication application such as Bluetooth or the like. Those skilled in the art will appreciate that various modifications, additions and substitutions are possible, without departing from the scope of the present invention. Therefore, the present invention is not limited to the above-described embodiments, but is defined by the following claims, along with their full scope of equivalents.

When an image is captured in accordance with the present invention, a clear image can be captured without blur by making use of the call connection and termination key serving as the shutter key provided in the earphone or the wireless headset connected to the mobile communication terminal, rather than making use of the shutter key provided in the conventional mobile communication terminal.

What is claimed is:

1. A method for performing a camera function in a mobile communication terminal, comprising the steps of:

configuring a predetermined key of an earphone as a shutter key for capturing an image, when the mobile communication terminal is switched to a camera mode in a state in which the mobile communication terminal is connected to the earphone, which comprises the predetermined key for performing call connection and termination functions;

detecting an incoming call received by the mobile communication terminal in the camera mode;

switching the mobile communication terminal to a call mode when the incoming call is detected; and configuring the predetermined key as a call connection and termination key when the mobile communication terminal is switched to the call mode.

2. The method according to claim 1, wherein the detecting step comprises:

detecting the incoming call in the mobile communication terminal through a paging channel connected to a base station.

3. The method according to claim 1, wherein the recognizing step comprises:

switching the mobile communication terminal back into the camera mode when a call termination request is present after the call connection function is performed.

4. A method for performing a camera function in a mobile communication terminal, comprising:

configuring a predetermined key of a wireless headset as a shutter key for capturing an image, when the mobile communication terminal for transmitting and receiving data is switched to a camera mode in a state in which it is connected to the headset, which comprises the predetermined key for performing call connection and termination functions in a wireless fashion; and capturing the image when an input signal of the predetermined key recognized as the shutter key is received from the headset.

* * * * *